INVENTOR.
WILLIAM E. BEAL
BY
ATTORNEYS

March 8, 1966 W. E. BEAL 3,238,765
APPARATUS FOR DETERMINING THE COMBUSTION QUALITY OF A FUEL
Filed Dec. 18, 1961 5 Sheets-Sheet 2

INVENTOR.
WILLIAM E. BEAL
BY
ATTORNEYS

March 8, 1966 W. E. BEAL 3,238,765
APPARATUS FOR DETERMINING THE COMBUSTION QUALITY OF A FUEL
Filed Dec. 18, 1961 5 Sheets-Sheet 3

INVENTOR.
WILLIAM E. BEAL
BY
ATTORNEYS

March 8, 1966 W. E. BEAL 3,238,765
APPARATUS FOR DETERMINING THE COMBUSTION QUALITY OF A FUEL
Filed Dec. 18, 1961 5 Sheets-Sheet 4

INVENTOR.
WILLIAM E. BEAL
BY
ATTORNEYS

March 8, 1966     W. E. BEAL     3,238,765
APPARATUS FOR DETERMINING THE COMBUSTION QUALITY OF A FUEL
Filed Dec. 18, 1961     5 Sheets-Sheet 5

DETONATION TIME

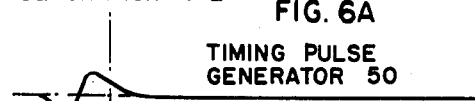
FIG. 6A
TIMING PULSE GENERATOR 50

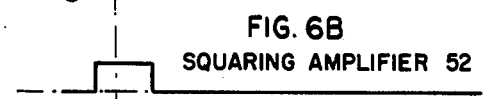
FIG. 6B
SQUARING AMPLIFIER 52

FIG. 6C
HIGH PASS FILTER 44   VALVE NOISE

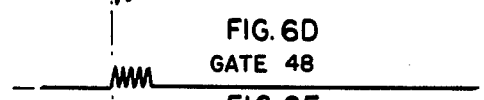
FIG. 6D
GATE 48

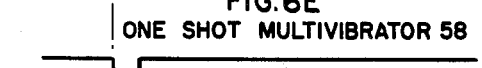
FIG. 6E
ONE SHOT MULTIVIBRATOR 58

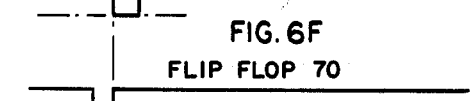
FIG. 6F
FLIP FLOP 70

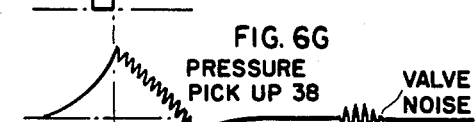
FIG. 6G
PRESSURE PICK UP 38   VALVE NOISE

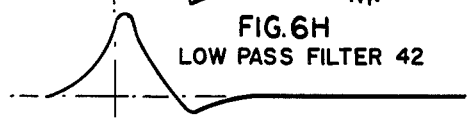
FIG. 6H
LOW PASS FILTER 42

FIG. 6I
GATE 60

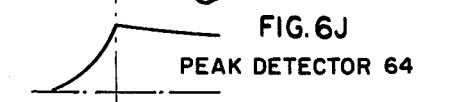
FIG. 6J
PEAK DETECTOR 64

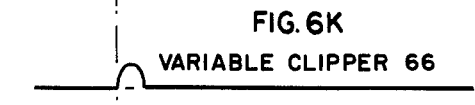
FIG. 6K
VARIABLE CLIPPER 66

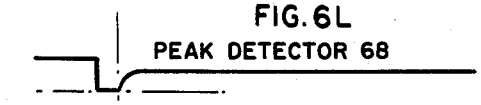
FIG. 6L
PEAK DETECTOR 68

TIME →

DETONATION TIME

FIG. 7A
PRESSURE PICK UP 38'   VALVE NOISE

FIG. 7B
BAND PASS FILTER 74   VALVE NOISE

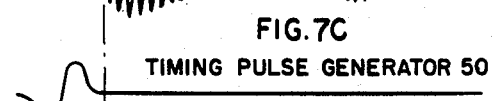
FIG. 7C
TIMING PULSE GENERATOR 50'

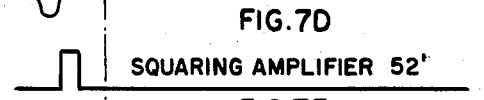
FIG. 7D
SQUARING AMPLIFIER 52'

FIG. 7E
PEAK DETECTOR 78

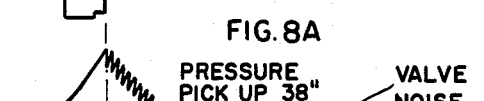
FIG. 8A
PRESSURE PICK UP 38"   VALVE NOISE

FIG. 8B
HIGH PASS FILTER 82   VALVE NOISE

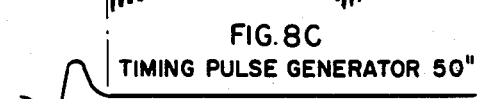
FIG. 8C
TIMING PULSE GENERATOR 50"

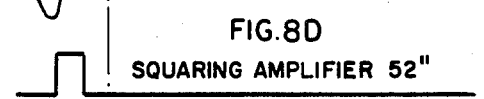
FIG. 8D
SQUARING AMPLIFIER 52"

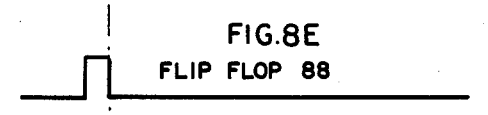
FIG. 8E
FLIP FLOP 88

FIG. 8F
GATED TIME SWEEP GENERATOR 90

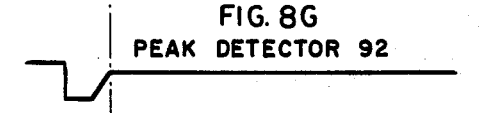
FIG. 8G
PEAK DETECTOR 92

TIME →

INVENTOR.
WILLIAM E. BEAL
BY *Oswald E. Hayes*
ATTORNEYS

United States Patent Office 3,238,765
Patented Mar. 8, 1966

3,238,765
APPARATUS FOR DETERMINING THE
COMBUSTION QUALITY OF A FUEL
William E. Beal, Glassboro, N.J., assignor to Socony
Mobil Oil Company, Inc., a corporation of New York
Filed Dec. 18, 1961, Ser. No. 160,051
6 Claims. (Cl. 73—35)

This invention relates to the determination of the combustion quality of a fuel for internal combustion engines by test in a standard engine, and, more particularly, to means for automatically regulating such a standard engine during a test in accordance with signals representative of the combustion process of the fuel in the engine.

With the recent developments in automotive engines and in automotive engine fuels, testing procedures for determining the combustion quality of such fuels to aid in maintaining pre-established fuel standards have become all important. One particular testing procedure is disclosed in copending application Serial No. 160,052, for Automated Engine for Determining the Combustion Quality of a Fuel, filed on December 18, 1961 in the name of A. E. Traver. In that application, a testing spark ignition engine or a testing compression ignition engine is powered by a fuel under test and is automatically regulated so as to maintain substantially constant a particular aspect of the combustion process of the fuel. In one form of that invention, the compression ratio of the engine is continually adjusted so that detonation, if the fuel under test is a gasoline, or ignition, if the fuel under test is a diesel fuel, occurs during a predetermined interval in each engine cycle. In another form of that invention for the testing of gasolines, detonation is retained at a relatively fixed magnitude by a continuous adjustment of the compression ratio. The combustion quality of the test fuel is determined by comparing the compression ratios of the engine using the test fuel with ratios obtained under similar conditions using reference fuels of known combustion qualities to power the engine.

The automatic regulating system of the copending application Serial No. 160,052 is a "no-null" system in which the compression ratio is continuously changed, i.e., increased in response to a reference signal generated once during each engine cycle and decreased in response to detonation or ignition of a predetermined character. The present invention, however, involves a "null type" system for automatically regulating an engine powered by a test fuel. In particular, signals indicative of detonation of a gasoline or ignition of a diesel fuel are generated and compared with reference signals that are indicative of a predetermined detonation or ignition time in an engine cycle, for example. As a result of the comparision, an error signal is generated that is applied to a servo motor coupled to the testing engine which controls a variable element thereof, for example, the compression ratio of the engine. The error signal drives the servo motor to change the compression ratio so that the actual detonation or ignition time corresponds very closely to the predetermined time. Thus, the compression ratio is established at a "null" value at which the error signal is practically zero, and the compression ratio is changed whenever necessary to maintain the error signal substantially at zero. Alternatively, in the case of a test gasoline, the compression ratio is changed in response to an error signal that is indicative of the difference between the magnitude of the actual detonation occuring and the magnitude of a predetermined reference detonation.

A safety feature is incorporated to prevent the compression ratio from being changed to an extreme value due to a complete lack of detonation of the gasoline in the engine, for example. In particular, means is provided for automatically reducing the error signal to zero if detonation is absent during any engine cycle.

The invention further contemplates the provision of unique circuitry for generating the signals representative of detonation in a test fuel. Specifically, recognizing that detonation is characterized by a peak having high frequency components in the combustion pressure wave produced within the firing chamber of the engine, a signal representative of this peak is generated. In one embodiment of the invention, a signal representing the combustion pressure wave is passed through a high pass filter and a low pass filter, the low pass filter producing a signal whose general wave shape includes an envelope of the high frequency peak just described. This signal is gated to pass only that portion thereof that corresponds in time to the high pass filtered signal. Thus, a pulse is produced characteristic of the envelope of the high frequency peak. Advantageously, the gated low pass filtered signal is then passed through a peak detector to determine its maximum magnitude during each engine cycle, and a signal representative of this maximum magnitude is then compared with a reference signal to generate an error signal indicative of the difference between the magnitudes of the reference signal and the detonation peak signal.

Alternatively, the combustion pressure wave signal is passed through a band pass filter designed to pass only that portion of the signal corresponding to the high frequency detonation peak. This filtered signal is then applied directly to a peak detector which is reset once during each engine cycle by a timing signal. In this fashion, the maximum amplitude of the detonation peak is detected to provide a signal indicative of the magnitude of the detonation of the fuel in the engine.

To produce a reliable signal that is indicative of the time of occurrence of detonation in an engine cycle, the invention contemplates passing the combustion pressure wave signal through a high pass filter which produces a signal that includes the high frequency burst characteristic of detonation. A timing signal and the high pass filtered signal are employed to gate on and off, respectively, a time sweep generator to produce a signal whose magnitude is indicative of the time that lapses between the occurrence of the timing signal and the occurrence of the high frequency detonation burst. To isolate this magnitude, the gated time sweep signal is passed through a peak detector which is periodically reset to a reference condition.

For a better understanding of the invention, reference is made to the following detailed description of several representative embodiments and to the appended drawings, in which:

FIGS. 6A through 6L are typical waveform diagrams of the output signals from various components shown in FIG. 2;

FIGS. 7A through 7E are typical waveform diagrams of the output signals from various components shown in FIG. 3; and FIGS. 8A through 8G are typical waveform diagrams of the output signals from various components shown in FIG. 4.

Figure 1:
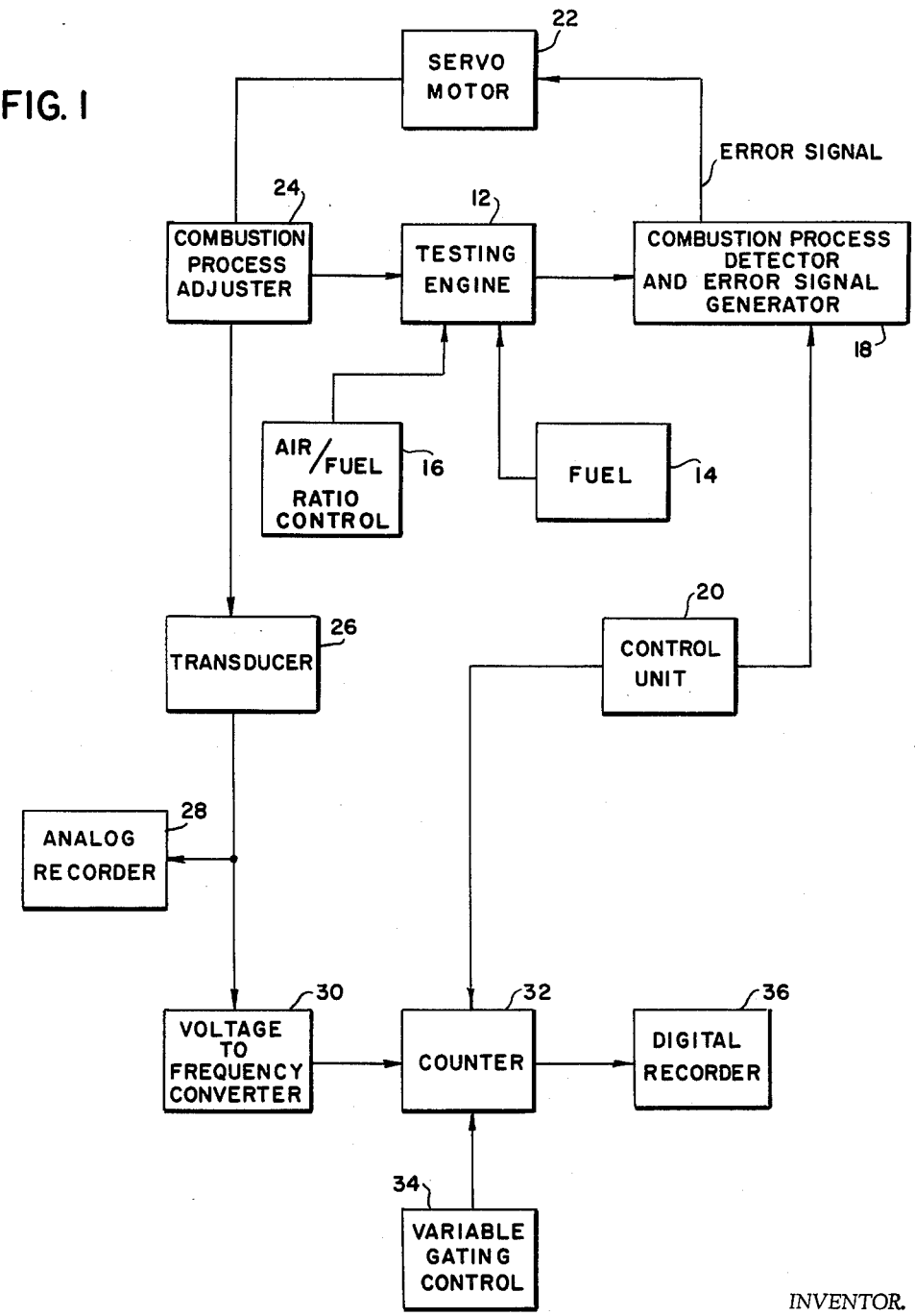
FIG. 1 is a block diagram of a basic system in accordance with the invention for determining the combustion quality of a fuel.

Referring to FIG. 1, a testing engine 12 is shown that is powered by a test fuel whose combustion quality is to be determined. The engine 12 may be of any suitable type such as the standard ASTM-CFR spark ignition engine commonly used for determining the octane ratings of gasoline, for example, or the standard ASTM-CFR compression ignition engine commonly used for determining the cetane ratings of diesel fuels. During a fuel test, such engines are deliberately run under conditions of standard knock and perform no useful work in a physical sense. The fuel is applied to the testing engine 12 from a fuel source 14, which includes the fuel under test and reference fuels. In the case of a spark ignition testing engine, an air/fuel ratio control 16 adjusts the ratio of air to fuel in the engine so that it is at an optimum value for any particular test conditions. A combustion process detector and error signal generator 18 is coupled to the testing engine 12, and, under the control of a control unit 20, generates an error signal which is applied to a servo motor 22. Within the combustion process detector and error signal generator 18, a signal is generated which is indicative of detonation of the fuel in the testing engine 12, if the fuel is a gasoline, or ignition of the fuel if the fuel is a diesel fuel, and this signal is compared with a reference signal indicative of a standard detonation or ignition. This comparison leads to the generation of the error signal which is applied to the servo motor 22.

For example, under the action of the control unit 20, the combustion process detector and error signal generator 18 may operate to produce an error signal which is indicative of the difference in magnitude between a reference detonation signal and a signal proportional to detonation of gasoline in the engine. Alternatively, the combustion process detector and error signal generator 18 may produce an error signal indicative of the difference in time between the occurrence of a reference detonation or ignition signal and the occurrence of detonation or ignition of the fuel used to power the testing engine 12.

The servo motor 22 is coupled to a combustion process adjuster 24 connected to the testing engine 12. The adjuster 24 may comprise, for example, an arrangement for changing the compression ration in the testing engine 12. As described in the copending application Serial No. 160,052, this may constitute mechanism for adjusting the position of the engine cylinder head with respect to a reference piston head position. In response to the error signal, the servo motor 22 controls the combustion process adjuster 24 so that detonation or ignition of the fuel in the testing engine is changed to reduce practically to zero the error signal that is applied to the servo motor 22. In this fashion, the testing engine 12 is operated at a null point at which detonation or ignition of the fuel conforms to a predetermined standard.

The combustion process adjuster 24 is coupled to a transducer 26 which provides a signal representative of the changes effected in the testing engine 12 by the combustion process adjuster. Signals from the transducer 26 are applied directly to an analogue recorder 28 for recordation therein and to a voltage to frequency converter 30. The converter 30 translates the analogue signals from the transducer 26 into digital signals which are applied to a counter 32 under the control of a variable gating control 34 and the control unit 20. The variable gating control 34 determines the time interval over which the counter 32 operates in one of many successive counting cycles. Signals from the counter 32 are applied to a digital recorder 36 which provides an output in digital form of the changes effected by the combustion process adjuster 24.

The data recorded by the analogue recorder 28 and the digital recorder 36 may be compared with similar data recorded in the same fashion for one or more reference fuels of known combustion quality, thereby enabling the combustion quality of the test fuel to be determined quickly and easily once its combustion characteristic, as represented by the compression ratio of the testing engine, is bracketed between the characteristics of two known reference fuels.

Figure 2:
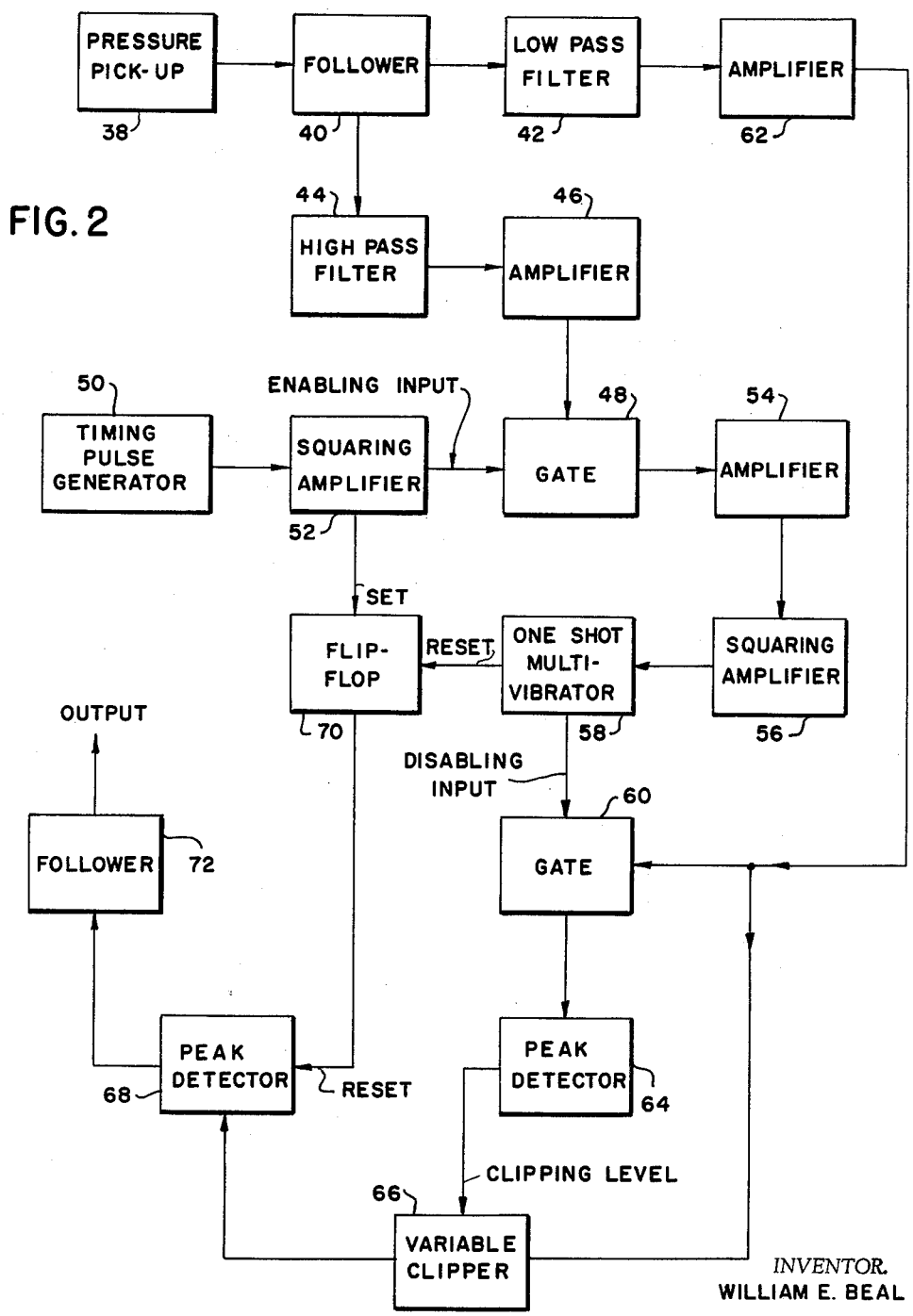
FIG. 2 is a block diagram of a circuit useful in the system of FIG. 1 for generating a signal representative of the higher frequency peak in a combustion pressure wave.

Referring now to FIG. 2, there is shown a circuit that forms part of the combustion process detector and error signal generator 18 of FIG. 1 for generating a signal indicative of detonation of a fuel in the testing engine 12. A pressure pick-up 38 is coupled to the testing engine 12 and may comprise, for example, a transducer positioned within the firing chamber (not shown) of the testing engine. The output from the pick-up thus is indicative of the pressure within the firing chamber which is in turn indicative of the combustion process. The waveform of the signal from the pick-up 38 is similar to that shown in FIG. 6G.

Referring to FIG. 6G, it may be seen that the signal from the pressure pick-up 38 increases rapidly but smoothly until a time at which the pressure fluctuates at a high frequency. At this time the pressure, after achieving a peak value, decreases with continuing rapid fluctuations. The actual detonation of the fuel in the engine is believed to be characterized by the high frequency peak in the combustion pressure wave. FIG. 2 illustrates circuitry for generating a signal which is indicative of this peak.

Referring to FIG. 2, the signal from the pressure pick-up 38 is applied to a follower 40 which is used to match impedances between the pressure pick-up 38 and a low pass filter 42 and a high pass filter 44 connected to the output of the follower 40. The low pass filter 42 filters the combustion pressure wave signal to remove the higher frequency components therefrom and produces a signal similar to that shown in FIG. 6H. The high pass filter 44 on the other hand filters the combustion pressure wave signal to remove the lower frequency components therefrom and produces a signal which is similar to that shown in FIG. 6C.

Signals from the high pass filter 44 are amplified in an amplifier 46 and applied to a gate 48. The gate 48 is controlled by timing signals (FIG. 6A) from a timing pulse generator 50 which is connected, for example, to the distributor of the test engine to generate a timing pulse once during each engine cycle. The signals from the generator 50 are applied to a squaring amplifier 52 which produces a square wave signal as shown in FIG. 6B. The square wave output signal from the squaring amplifier 52 is applied as an enabling input to the gate 48. In this fashion, the gate 48 produces an output signal only when it is enabled by the signal from the squaring amplifier. Thus, the output signal from the gate 48, as shown in FIG. 6D, is that portion of the amplified high pass filtered signal from the amplifier 46 that coincides in time with the square wave output signal from the squaring amplifier 52. Gating of the amplified high pass filtered signal is done to avoid detecting high frequency signals from the pressure pick-up 38 and the high pass filter 44 which are due to valve noise and not to detonation of the fuel in the engine. Such high frequency valve noise signals are shown in FIGS. 6G and 6C.

Output signals from the gate 48 are amplified in an amplifier 54 and then applied to a squaring amplifier 56 which produces a square wave output signal. The square wave signal from the squaring amplifier 56 triggers a one shot multivibrator 58 whose output signal is shown in FIG. 6E. An output pulse from the multivibrator 58 is applied as a disabling input to a gate 60. The gate 60 has applied thereto a signal from the low pass filter 42 after amplification in an amplifier 62. The output signal from the gate 60 is shown in FIG. 6I and is equivalent to the low pass filtered signal shown in FIG. 6H with a portion removed that corresponds to the pulse from the one shot multivibrator 58 shown in FIG. 6E. As may be seen, then, the low pass filtered signal after amplification in the amplifier 62 is gated at approximately the time of the high frequency peak in the combustion pressure wave. It should be noted that the gating should be such that the entire peak portion of the low pass filtered signal of FIG. 6H is gated out by the gate 60. This can be accomplished by making the pulse from the multivibrator 58 of suitable duration.

The signal from the gate 60 is applied to a peak detector 64 whose output signal, shown in FIG. 6J, is applied as the clipping level input signal to a variable clipper 66. Applied as the other input signal to the variable clipper 66 is the amplified low pass filtered signal from the amplifier 62. The variable clipper 66 operates to supply an output signal only if the signal from the amplifier 62 is greater than the signal from the peak detector 64. Thus, as may be seen from a comparison of FIGS. 6H and 6J, the variable clipper 66 produces an output signal equivalent to the small peak in the low pass filtered signal when this signal is greater than the clipping level signal from the peak detector 64. The output signal from the variable clipper 66 is shown in FIG. 6K. In essence, the low pass filtered signal (the output from the amplifier 62) is gated by the variable clipper 66 so that only that portion of the signal is passed by the variable clipper 66 which corresponds to the small peak in the low pass filtered signal corresponding to detonation.

The signal from the variable clipper 66, which is useful in itself as a signal representative of detonation and which may be applied to any apparatus for utilization, is shown in FIG. 2 as being applied to a peak detector 68 which detects the peak amplitude of the signal from the variable clipper. The peak detector is set once during each engine cycle by a reset signal (FIG. 6F) provided by a flip flop 70 which is set by the signal from the squaring amplifier 52 and reset by the one shot multivibrator 58. The peak detected signal, shown in FIG. 6L, is representative of the magnitude of the detonation of the fuel in the engine, and is applied to a follower 72 which is used to match the impedances between the peak detector 68 and any equipment that is coupled to the output of the follower 72.

Figure 3:
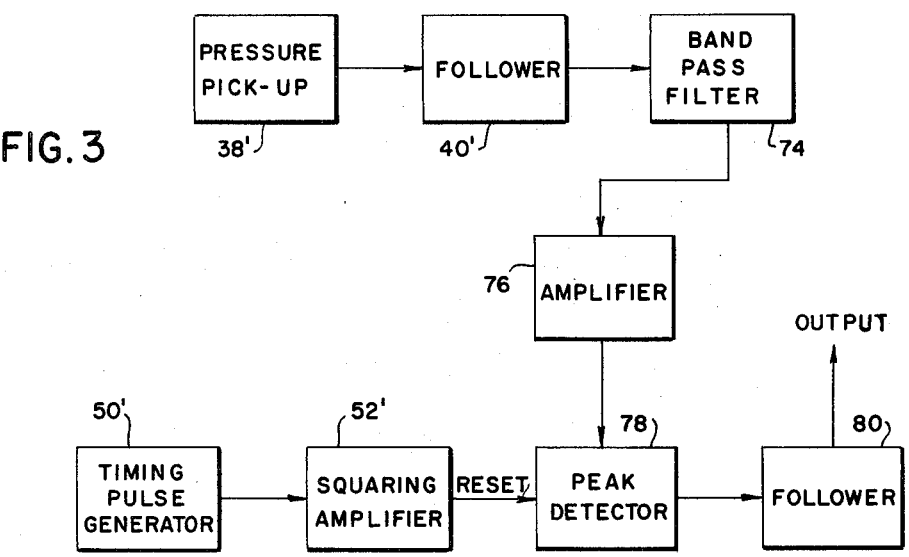
FIG. 3 is a block diagram of another circuit for generating a signal representative of the high frequency peak in a combustion pressure wave.

Turning now to FIG. 3, another circuit for generating a detonation signal is shown. Signals indicative of the combustion pressure wave are supplied by a pressure pick-up 38' similar to tthe like numbered pick-up of FIG. 2. The signals from the pick-up 38' (FIG. 7A) are applied through a follower 40' to a band pass filter 74 whose characteristics are such as to pass as an output signal only that portion of the input signal which falls within a predetermined frequency range. For the purpose of detecting the high frequently detonation peak, the band pass filter may be set, for example, to pass the frequencies 6250 to 6750 cycles per second.

The output signal from the band pass filter (FIG. 7B) is amplified in an amplifier 76 whose output is coupled directly to a peak detector 78. Once during each engine cycle the peak detector 78 is reset by a timing pulse (FIG. 7C) from a timing pulse generator 50'. The generator 50' is coupled to a squaring amplifier 52' which produces a square wave output signal (FIG. 7D) that provides a resetting input signal to the peak detector 78.

As may be seen, the above-described components of FIG. 3 operate to isolate that portion of the combustion pressure wave signal that corresponds to the high frequency burst characteristic of detonation. Signals representative of valve noise (FIGS. 7A and 7B) are not detected since they occur later in an engine cycle than the detonation signal and since they are of a magnitude less than the peak magnitude of the detonation signal detected by the peak detector 78. Because of this, the peak detector supplies an output signal (FIG. 7E) representative of detonation whose magnitude is greater than any signal representative of valve noise, and thus when the valve noise signals are applied to the peak detector from the amplifier 16, they do not affect or change the output signal. Of course, this is dependent upon selecting a standard detonation intensity which is greater than the magnitudes of valve noises. The standard detonation intensity prescribed by the ASTM Code satisfies this criterion.

For these same reasons, the gating provided by the gate 48 of FIG. 2 is not needed if the detonation intensity is greater than valve noises. However, with the gating, valve noises are blocked out, and the circuit functions even when valve noises are of a greater magnitude than detonation.

Figure 4:
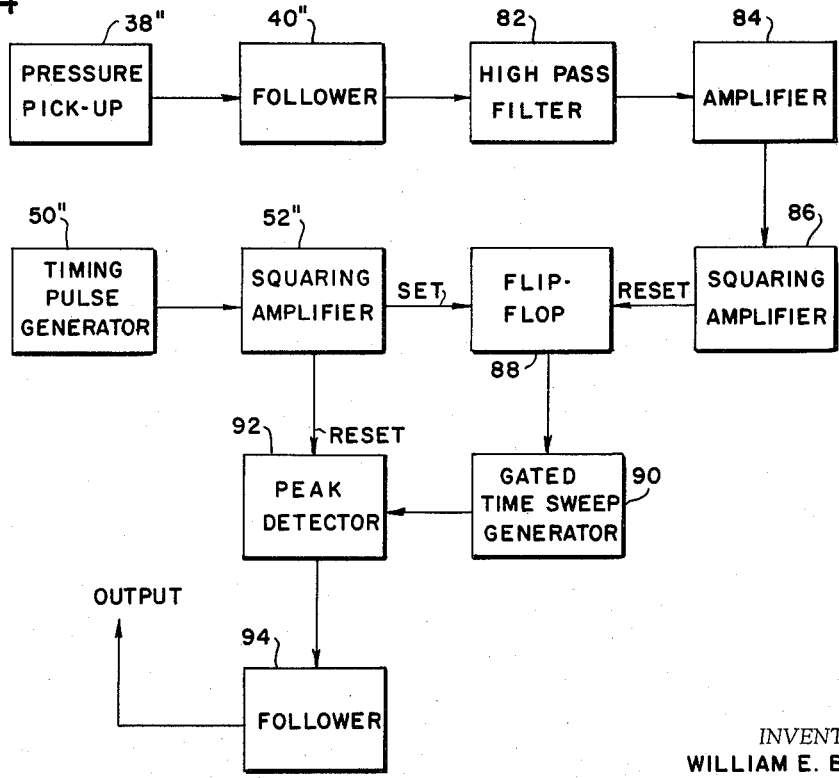
FIG. 4 is a block diagram of a circuit useful in the basic system of FIG. 1 for generating a signal indicative of the difference in times of occurrence between a timing signal and the high frequency peak in a combustion pressure wave.

In FIG. 4 there is shown a circuit for generating a signal which is indicative of the difference in time between the occurrence of a timing signal and the occurrence of a signal indicative of detonation of a fuel in a testing engine. The combustion pressure wave from the engine cylinder is detected by a pressure pick-up 38" whose output signal is shown in FIG. 8A. This signal is passed through a follower 40" and applied to a high pass filter 82 which passes only the high frequency components of the combustion pressure wave signal. The signal from the high pass filter 82 (FIG. 8B) is amplified in an amplifier 84 whose output is coupled to a squaring amplifier 86 which produces a square wave output signal. The output signal from the squaring amplifier 86 is used to reset a flip flop 88. The flip flop 88 is first set by timing signals from a timing pulse generator 50" (FIG. 8C) and a squaring amplifier 52" (FIG. 8D).

The output signal from the flip flop 88 (FIG. 8E) is applied to a gated time sweep generator 90 that produces a time sweep signal of limited duration, as shown in FIG. 8F. Specifically, the generator 90 is gated on to commence generating a sawtooth signal when the flip flop 88 is set by the signal from the squaring amplifier 52". The generator 90 continues generating the sawtooth signal until the flip flop 88 is reset by the signal from the squaring amplifier 86, at which time the generator 90 is gated off. As may be seen, then, the peak amplitude of the signal generated by the gated time sweep generator 90 is indicative of the time lapse between the occurrence of the timing signal from the timing pulse generator 50" and the occurrence of the signal from the high pass filter 82 which is indicative of detonation.

The signal from the gated time sweep generator 90 is applied to a peak detector 92 which is reset once during each engine cycle by signals from the squaring amplifier 52". The output signals from the peak detector 92 (FIG. 8G) are applied to a follower 94 which is used to match impedances between the peak detector 92 and additional circuitry (not shown in FIG. 4) coupled thereto by the follower 94.

As may be seen, the circuit of FIG. 4 utilizes relatively few components to generate a detonation time-of-occurrence signal. It may be noted that special gating to eliminate valve noises (FIGS. 8A and 8B) is not needed since the flip flop 88 is set by the reference signal from the squaring amplifier 52" and then immediately reset by the signal from the squaring amplifier 86. Valve noises occur much later in an engine cycle than detonation, and thus the gating on and off of the time sweep generator 90 is completed well before the valve noise signal are received.

Figure 5:
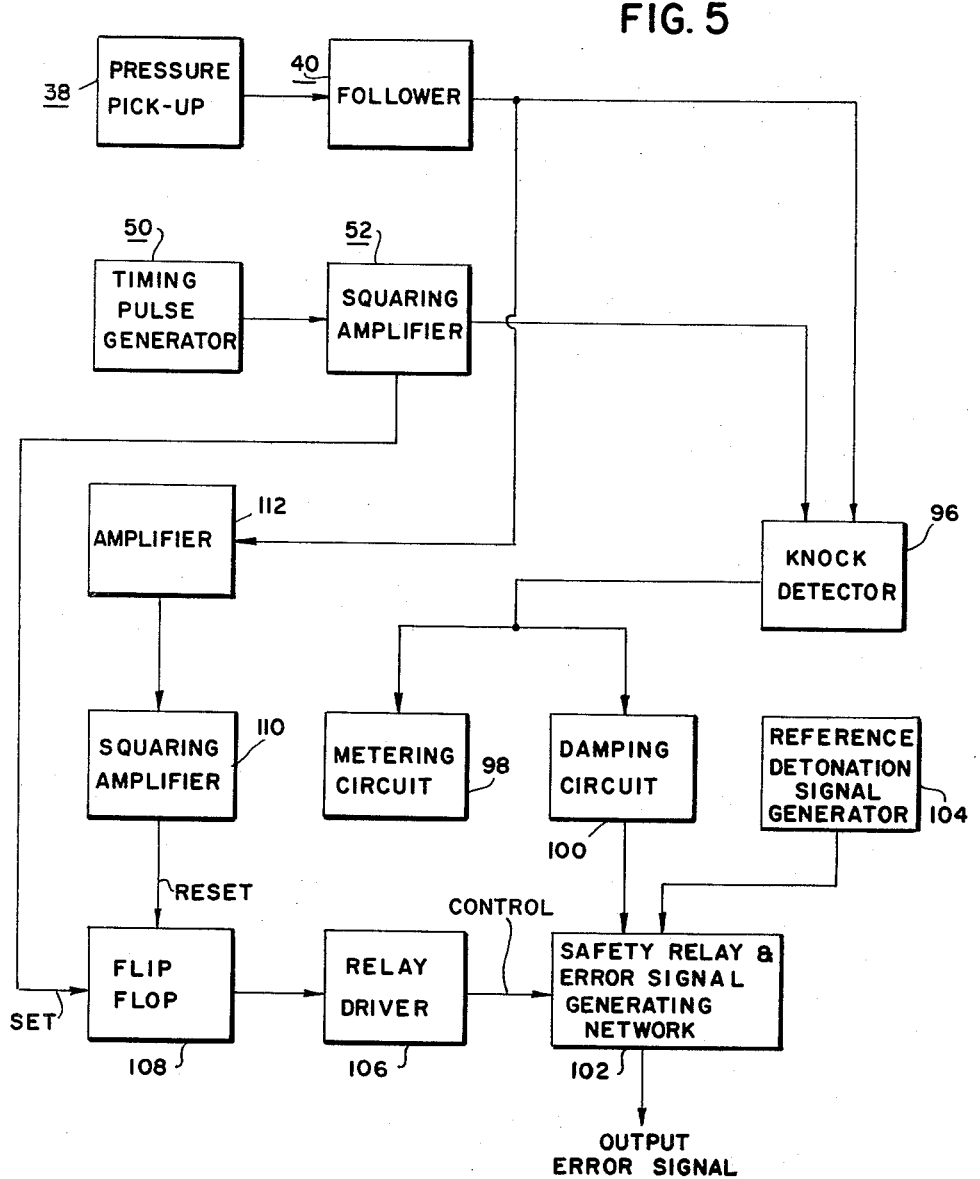
FIG. 5 is a block diagram of a protection circuit useful in the basis system of FIG. 1.

FIG. 5 shows a safety or protection circuit useful in conjunction with the basic system of FIG. 1 and any one of the detonation signal generating circuits of FIGS. 2, 3, and 4. The circuit operates to prevent the servo motor 22 of FIG. 1 from driving the combustion process adjuster 24 to an extreme position in the event that detonation does not occur at any time in the testing engine 12.

In the circuit of FIG. 5, the pressure pick-up 38, the follower 40, the timing pulse generator 50, and the squaring amplifier 52 are equivalent to the like numbered components of FIGS. 2 through 4. Signals from the follower 40 and the squaring amplifier 52 are applied to a knock detector 96 which is equivalent to any one of the detonation signal generating systems of FIGS. 2, 3, and 4. The signal from the knock detector 96, which is indicative of the magnitude of the detonation of the fuel in the testing engine or the time of occurrence of the detonation, is applied to a metering circuit 98 for direct metering of the signal. The signal from the knock detector 96 is also applied to a damping circuit 100 which smoothes out minor variations in the signal.

Output signals from the damping circuit 100 are applied as one input to a safety relay and error signal generating network 102, the other input to which is coupled to a reference detonation signal generator 104. The reference detonation signal generator 104 provides a signal which is indicative of a standard detonation magnitude or a standard detonation time at which it is desired to maintain the detonation in the testing engine.

The signals from the generator 104 and the damping circuit 100 are compared within the safety relay and an output error signal equal to the difference between error signal generating network 102 which generates the two input signals.

The network 102, however, is under the control of signals from a relay driver 106 that is in turn controlled by output signals from a flip flop 108. Once during each engine cycle the flip flop is set by signals from the squaring amplifier 52. During the same engine cycle the flip flop 108 is reset by signals from a squaring amplifier 110 which produces a square wave output signal from an input signal received from the follower 40 after amplification in an amplifier 112. As may be seen, the flip flop 108 is reset if a signal is received from the pressure pick-up 38.

The time constant of the relay driver 106 is established so that if the flip flop 108 is first set and then immediately reset in the same engine cycle the relay driver is not actuated. If, however, the flip flop 108 is set and then is not immediately reset, which is the case if detonation does not occur in an engine cycle, the relay driver 106 is actuated, thereby providing a control signal to the safety relay and error signal generating network 102. In response to this control signal, the output error signal is automatically reduced to zero. In this fashion the servo motor 22 of FIG. 1 receives no input signal, thereby avoiding driving the combustion process adjuster 24 to one of its two extreme positions when no detonation signal is received in an engine cycle.

It should be noted that valve noise signals do not affect the operation of the circuit of FIG. 5, since such signals occur relatively late in an engine cycle and cannot operate to prevent actuation of the relay driver 106 when no detonation signal is received even though they serve to reset the flip flop 108. Further, the circuit may also serve to protect against the absence of ignition in the testing of diesel fuels.

From the description of the invention, it is apparent that a system has been provided for automatically operating a testing engine employed to determine the combustion quality of an automotive fuel. Such a system operates in response to an error signal generated to provide an indication of the difference between the actual detonation or ignition of the fuel in the engine and a desired detonation or ignition, with the control being such as to reduce the error signal practically to zero. Several different forms of appartus have been described for the generation of detonation signals which are either indicative of the magnitude of detonation or of the time of occurrence of detonation in an engine cycle. It may be appreciated that modifications of the circuits shown may be made which, nonetheless, fall within the scope of the invention. For example, each of the circuits shown in FIGS. 2 through 4 generates a signal whose magnitude is indicative of some particular aspect of detonation. Such circuits could also utilize the phase or frequency of a particular signal to provide such an indication. Accordingly, the invention should not be deemed to be limited except as it is defined by the following claims.

I claim:

1. In a single-cylinder test engine for conducting a test of the combustion quality of a motor fuel, the engine performing no useful work and having a repetitive operating cycle, the improvement comprising means for generating a combustion-process signal indicative of the combustion process of the fuel in the engine, the signal containing a low-frequency component and, when detonation occurs, a high-frequency component, said low-frequency component having a peak amplitude which, when detonation occurs, is a function of the intensity of the detonation and said high-frequency component occurring at a time which is a function of the time of occurrence of the detonation, means for filtering the combustion-process signal to produce a low-pass filtered signal containing said low-frequency component and a high-pass filtered signal containing said high-frequency component, and gating means responsive to the high-pass filtered signal for performing the operation of gating the low-pass filtered signal when detonation occurs to pass as an output an output signal corresponding to the low-pass filtered signal with a portion removed that (a) coincides in time with the high-pass filtered signal and hence (b) is a function of the intensity of the detonation, the output signal thus having a peak amplitude which, regardless of whether detonation occurs, is independent of the intensity of the detonation and equal to the peak amplitude of the output signal in the absence of detonation.

2. In a single-cylinder test engine for conducting a test of the combustion quality of a motor fuel, the engine performing no useful work and having a repetitive operating cycle, the improvement comprising pick-up means for generating a combustion-process signal indicative of the combustion process of the fuel in the engine, the signal containing a low-frequency component and, when detonation occurs, a high-frequency component, said low-frequency component having a peak amplitude which, when detonation occurs, is a function of the intensity of the detonation and a frequency lower than a first predetermined frequency and said high-frequency component occurring at a time which is a function of the time of occurrence of the detonation and a frequency higher than a second predetermined frequency higher than said first predetermined frequency, means for filtering the combustion-process signal to produce a low-pass filtered signal containing said low-frequency component and a high-pass filtered signal containing said high-frequency component, and gating means responsive to the high-pass filtered signal for performing the operation of gating the low-pass filtered signal when detonation occurs to pass as an output an output signal corresponding to the low-pass filtered signal with a portion removed that (a) coincides in time with the high-pass filtered signal and hence (b) is a function of the intensity of the detonation, the output signal thus having a peak amplitude which, regardless of whether detonation occurs, is independent of the intensity of the detonation and equal to the peak amplitude of the output signal in the absence of detonation.

3. Apparatus as recited in claim 2 further comprising timing means for generating a timing signal during the portion of an engine cycle when detonation may occur, the timing signal enabling the gating means to perform said operation during such portion of the engine cycle.

4. In combination with apparatus as recited in claim 2, means for detecting during each engine cycle the peak amplitude of the output signal.

5. In combination with apparatus as recited in claim 4, means for subtracting the peak amplitude of the output signal from the peak amplitude of the low pass filtered signal to produce a further output signal, second peak detector means for detecting during each engine cycle the peak amplitude of the further output signal, and means for resetting the second peak detection means to a predetermined reference level during each engine cycle.

6. In a single-cylinder test engine for conducting a test of the combustion quality of a motor fuel, the engine performing no useful work and having a repetitive operating cycle, the improvement comprising pick-up means for generating a combustion-process signal indicative of the combustion process of the fuel in the engine, the signal containing a low-frequency component and, when detonation occurs, a high-frequency component, said low-frequency component having a peak amplitude which, when detonation occurs, is a function of the intensity of the detonation and a frequency lower than a first predetermined frequency and said high-frequency component occurring at a time which is a function of the time of occurrence of the detonation and a frequency higher than a second predetermined frequency higher than said first predetermined frequency, means for filtering the combustion-process signal to produce a low-pass filtered signal containing said low-frequency component and a high-pass filtered signal containing said high-frequency component, means for generating a timing signal during the portion of an engine cycle when detonation may occur, gating means responsive to the timing signal for gating the high-pass filtered signal to produce a gated high-pass filtered signal that is representative of that portion of the high-pass filtered signal that coincides in time with the timing signal, means responsive to the gated high-pass filtered signal for reducing the amplitude of the low-pass filtered signal to a predetermined reference amplitude thereby to produce a modified low-pass filtered signal, means for detecting the peak amplitude of the modified low-pass filtered signal, and variable clipping means for producing an output signal representative of the amount by which the low-pass filtered signal exceeds the peak detected modified low-pass filtered signal.

References Cited by the Examiner

UNITED STATES PATENTS

| | | | |
|---|---|---|---|
| 2,337,522 | 12/1943 | Eldredge | 73—35 |
| 2,395,902 | 3/1946 | Nisewanger et al. | 73—35 X |
| 2,448,322 | 8/1948 | Piety | 73—35 |
| 2,496,337 | 2/1950 | De Boisblanc | 73—35 |
| 2,496,338 | 2/1950 | Barton | 73—35 |
| 2,508,996 | 5/1950 | Elam | 73—35 X |
| 2,633,738 | 4/1953 | De Boisblanc | 73—35 |
| 2,679,746 | 6/1954 | De Boisblanc | 73—35 |
| 2,715,832 | 8/1955 | McCollom et al. | 73—35 |
| 2,888,822 | 6/1959 | Burhans | 73—35 |
| 2,936,609 | 5/1960 | Pope et al. | 73—35 |
| 2,941,396 | 6/1960 | Adams | 73—35 |
| 2,978,656 | 4/1961 | Wilcox | 333—75 |

RICHARD C. QUEISSER, *Primary Examiner.*

DAVID SCHONBERG, *Examiner*